United States Patent
Krstulich

(10) Patent No.: US 9,172,726 B2
(45) Date of Patent: Oct. 27, 2015

(54) IMPAIRMENT REDUCTION FOR TANDEM VOIP CALLS

(75) Inventor: Zlatko Krstulich, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 2157 days.

(21) Appl. No.: 12/241,659

(22) Filed: Sep. 30, 2008

(65) Prior Publication Data

US 2010/0080212 A1 Apr. 1, 2010

(51) Int. Cl.
  *H04L 29/06* (2006.01)
  *H04M 7/12* (2006.01)
  *H04M 11/06* (2006.01)

(52) U.S. Cl.
  CPC ............ *H04L 65/1069* (2013.01); *H04L 65/80* (2013.01); *H04L 69/24* (2013.01); *H04M 7/124* (2013.01); *H04M 11/066* (2013.01)

(58) Field of Classification Search
  CPC ... H04L 65/1069; H04L 65/80; H04M 7/006; H04W 36/0083; H04W 36/385
  See application file for complete search history.

(56) References Cited

U.S. PATENT DOCUMENTS

| 6,169,735 | B1 * | 1/2001 | Allen et al. | 370/352 |
|---|---|---|---|---|
| 7,039,059 | B2 | 5/2006 | Mizusawa et al. | |
| 2004/0131053 | A1 * | 7/2004 | Sjolund et al. | 370/356 |
| 2007/0076662 | A1 * | 4/2007 | Jain et al. | 370/331 |
| 2007/0242676 | A1 * | 10/2007 | Fridman | 370/395.5 |
| 2007/0274306 | A1 * | 11/2007 | Kouchri et al. | 370/389 |

FOREIGN PATENT DOCUMENTS

WO 96/31993 A1 10/1996

\* cited by examiner

*Primary Examiner* — Yong Zhou
(74) *Attorney, Agent, or Firm* — Marks & Clerk

(57) ABSTRACT

A method and apparatus are provided for allowing IP end-points to communicate over a PSTN with improved signal quality. Watermarks are used in the handshaking between the end-points when a communication session is being established, the watermarks indicating that the endpoints are capable of VoIP. If the two end-points establish that they are each VoIP-capable then packet data is inserted into a TDM channel using a framing technique managed by the gateways, with the bearer data being native to the VoIP devices, avoiding the lossy conversion of packet-voice data to 64 kb/s PCM and back to packet data again, realizing that the other end-point will be able to decode the data. If an IP-enabled endpoint determines that the other endpoint is not IP-enabled, then the data is inserted into the TDM channel by the gateway after conversion to 64 kb/s PCM so that the resulting TDM stream remains compatible with the PSTN and non-IP endpoints.

19 Claims, 3 Drawing Sheets

IMPAIRMENT REDUCTION FOR TANDEM VOIP CALLS

FIELD OF THE INVENTION

The invention relates to Voice over IP communications, and in particular to improving voice quality when VoIP calls traverse the PSTN.

BACKGROUND OF THE INVENTION

Voice over Internet Protocol (VoIP) services allow IP telephones to communicate with each other over the Internet. However, an IP telephone may also be used to communicate through with traditional telephones through the PSTN. In order to do this, a gateway is typically used to convert the voice data packets from the IP telephone to a TDM stream using a 64 kb/s PCM format so that it may traverse the PSTN and be received, and understood, by a traditional telephone.

Two IP telephones may also communicate over the PSTN if one calls the other one using a standard telephone number, such as an NPA-NXX number, and where such communication is enabled by a pair of IP/PSTN gateways. This type of PSTN mediated call may be required in cases where the IP capability or addressability of the other VoIP endpoint is not known, which is often the case where the administrative domains of the VoIP endpoints differ. If a VoIP endpoint does not know what type of phone is at the other end of the communication, it must assume that the other endpoint is a traditional telephone which requires normal 64 kb/s TDM communication through the PSTN, and so conversion from packet voice data to 64 kb/s PCM is employed. IP telephones will often use one of several standardized voice compression algorithms before packetization of the voice stream. These algorithms are known as "lossy" since each successive compression and decompression will result in increased latency and reduced voice quality. A call involving two IP telephones over the PSTN can then involve an initial compression of the voice stream, a decompression (to 64 kb/s PCM), and then a recompression by the distant gateway to the IP endpoint. This reduces the quality of the communication to below that which could be otherwise be achieved if the two IP telephones recognize that each other is capable of packet based communications, and could communicate directly in the packet domain without requiring translation to confines of 64 kb/s PCM voice.

A mechanism which allowed IP telephones to communicate directly with each other over the PSTN in the packet domain while still allowing interworking of IP telephones with the legacy PSTN would improve speech quality, and also enable support of functionality beyond simple voice.

SUMMARY OF THE INVENTION

In accordance with one aspect of the invention, a method is provided by which a first communication device, which is VoIP-capable, communicates with a second communication device over TDM channels of the PSTN. The second communication device is informed that the first communication device is VoIP-capable by embedding a watermark in communications transmitted over the PSTN. The first communication device determines whether the second communication device is VoIP-capable by searching for an acknowledgment embedded in communications received over the PSTN. If it is determined that the second communication device is VoIP-capable, the first communication device sends packet data to the second communication device as IP framed data over a TDM channel.

In accordance with another aspect of the invention, a VoIP-capable communication device is provided. The communication device includes means for establishing a 64 kb/s TDM bearer channel with a second communication device over the PSTN. The communication device also includes means for embedding a watermark within the TDM bearer channel, the watermark indicating that the communication device is VoIP-capable. The communication device also includes means for detecting an acknowledgment within the TDM bearer channel received from the second communication device, the acknowledgment indicating that the second communication device is VoIP-capable. The communication device also includes means for sending packet data to the second communication device as IP framed data over the TDM bearer channel in the event the acknowledgment is detected.

The methods of the invention may be stored as processing instructions on computer-readable storage media, the instructions being executable by a computer processor.

The methods and apparatus of the present invention allow IP-enabled endpoints, such as IP telephones, to recognize each other as VoIP-capable, and negotiate a mutually compatible packet-to-packet mode of communication through a transparent TDM voice channel. By negotiating compatible codecs and packet framing with an aggregate data rate of under 64 kb/s, the IP endpoints may be able to communicate directly in the packet mode over a 64 kb/s TDM channel, avoiding needless lossy conversion. If the IP-enabled endpoints can go native when communicating over the PSTN, the IP-enabled devices may also exchange other relevant data, including images and/or texting data, over the ostensibly "voice only" PSTN, as long as the data stream is shaped within the limits of a 64 kb/s TDM channel. Since communication between the VoIP-capable devices is in a native packet mode, the VoIP packets can encode wideband voice calls with native end-point quality exceeding 64 kb/s PCM.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
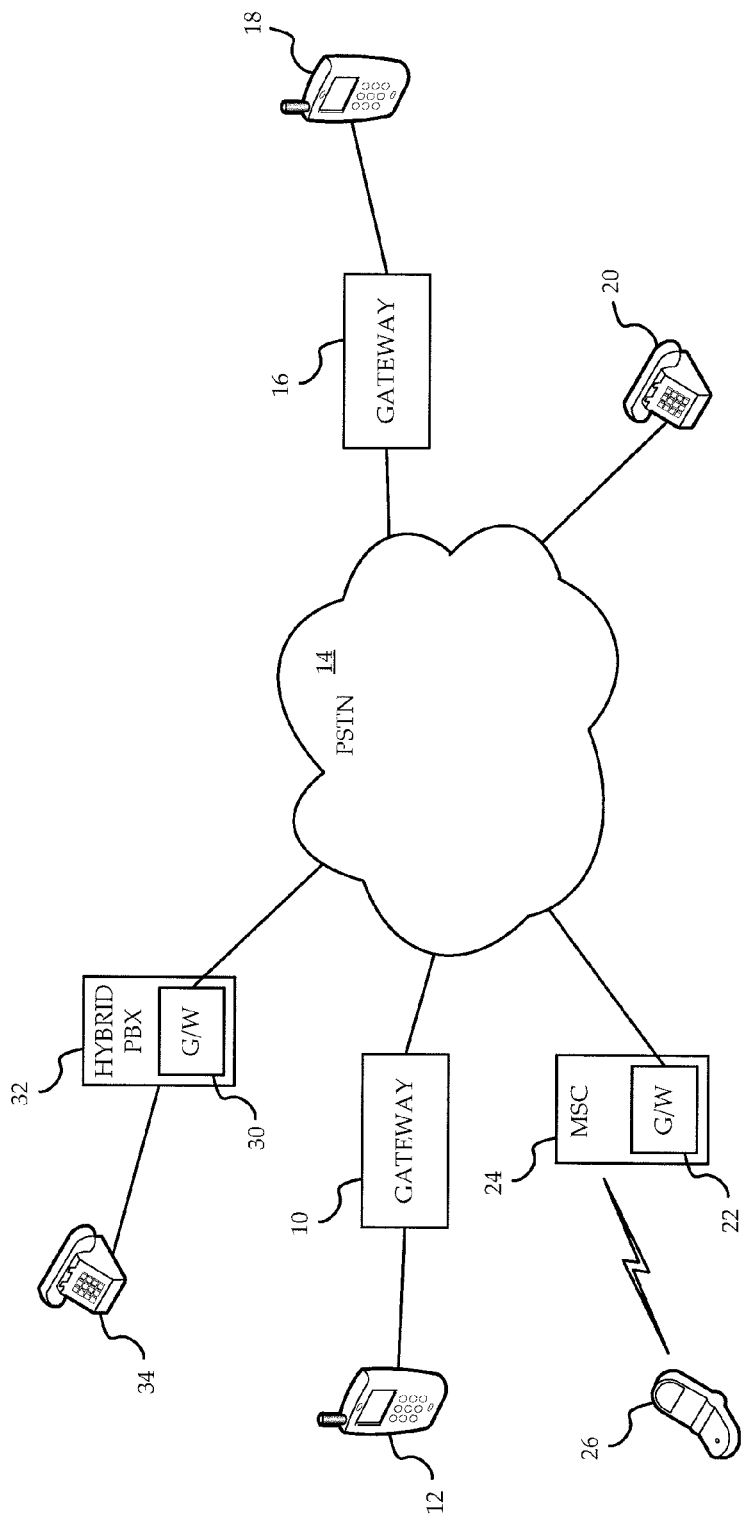
FIG. 1 is a block diagram of a portion of a telecommunication network according to one embodiment of the invention.

Referring to FIG. 1, a block diagram of a portion of a telecommunication network according to one embodiment of the invention is shown. A gateway 10 connects an IP telephone 12 to a PSTN 14. A second gateway 16 connects a second IP telephone 18 to the PSTN 14. The second gateway 16 may be part of a different operator domain than the first gateway 10. A traditional telephone 20 is also connected to the PSTN 14. It should be noted that the second gateway 16, the second IP telephone 18, and the traditional telephone 20 are included in FIG. 1 for the purposes of illustrating the methods of the invention. In general there will be any number of IP telephones, including none, and any number of traditional telephones, including none.

The embodiments of the invention will be described with reference to the gateway 10 of the IP telephone 12. The invention may alternatively be in the form of any gateway which allows a VoIP-capable communication device to communicate over the PSTN. For example, a gateway 22 within an MSC 24 may allow a VoIP-capable cell phone 26 to communicate through the PSTN 14. As another example, a gateway 30 within a Hybrid (POTS and IP) PBX 32 may allow a traditional telephone 34 to communicate through the PSTN 14. Similarly, the destination of a call initiated by the first IP telephone 12 may be a traditional telephone 20, or any VoIP-capable communication device. For example, the first IP telephone 12 may call a VoIP-capable cell phone connected to the PSTN through an MSC, or may call a traditional telephone connected to the PSTN through a Hybrid PBX.

The gateway 10 communicates through the PSTN 14 to a destination via a 64 kb/s TDM transport channel. If the first IP telephone 12 calls the second IP telephone 18, then the 64 kb/s TDM transport channel is established between the first gateway 10 and the second gateway 16. If the first IP telephone 12 calls the traditional telephone 20 then the 64 kb/s TDM transport channel is established between the first gateway 10 and the traditional telephone 20.

Broadly, a VoIP-capable communication device determines whether a second communication device is capable of VoIP. If so, the two communication devices enter a native packet mode by embedding their coded data in the 64 kb/s TDM channel using a common coding scheme without conversion to 64 kb/s PCM. If the VoIP-capable communication device does not determine that the second communication device is capable of VoIP then the VoIP-capable communication device converts its data to 64 kb/s PCM for insertion into the TDM channel, in the conventional manner. If the two communication devices are capable of VoIP, they may attempt to negotiate or agree upon the common coding scheme.

Figure 2:
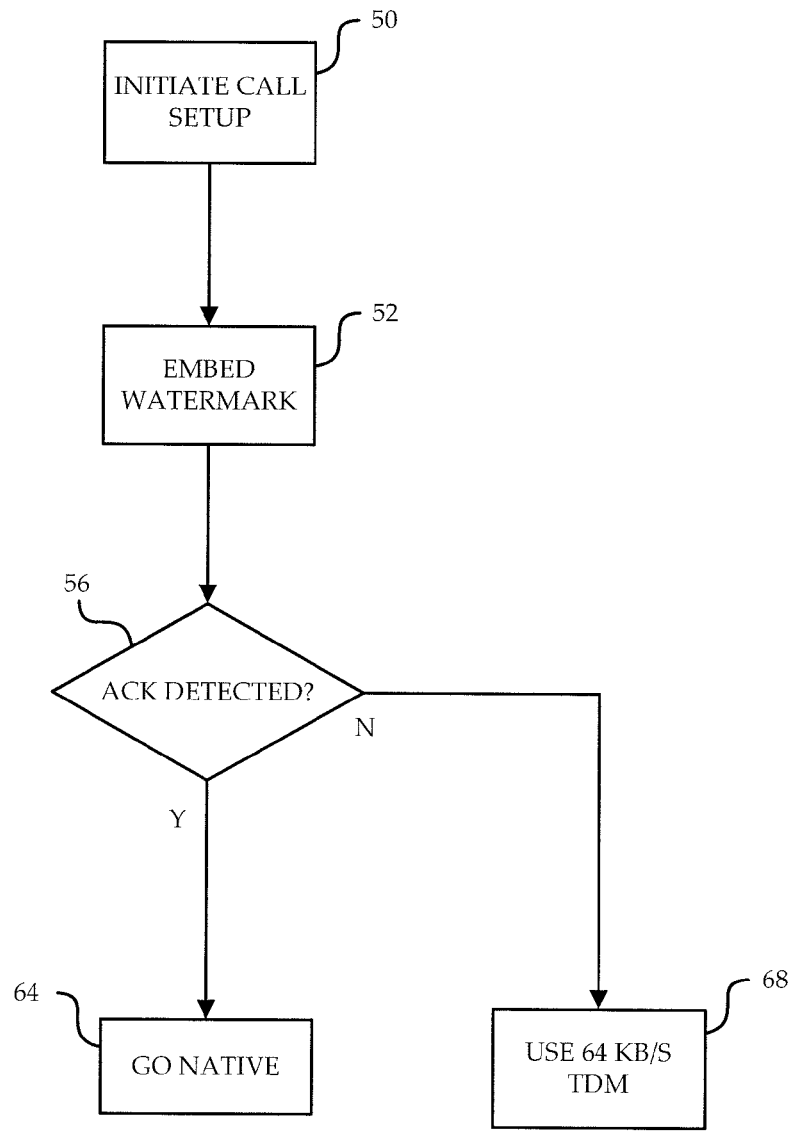
FIG. 2 is a flowchart of a method by which a gateway of FIG. 1 initiates a call request according to one embodiment of the invention.

Referring to FIG. 2, a flowchart of a method by which the gateway 10 initiates a call request according to one embodiment of the invention is shown. The method is initiated when the first IP telephone 12 attempts to communicate with an end-point by dialing a standard telephone number, such as an NPA-NXX number. The gateway 10 initiates the call setup at step 50 using the standard PSTN signaling protocols. After a TDM bearer channel is established between the gateway 10 and the gateway being called, the gateway 10 embeds a watermark in the bearer channel at step 52, indicating that the source of the call is capable of VoIP and indicating a preferred common coding scheme. For example, the gateway 10 may insert a short packet sequence into the PCM stream indicating that the source is IP-enabled, such as a regular pattern of bits in the least significant bit of periodic bytes. One scheme for embedding a watermark is described in WO 96/31993 as embedding a digital identification pattern, although the application is for deciding whether to tandem serial subrate (i.e. less than 64 kb/s) compressed TDM voice streams (stHCV) rather than whether to transmit IP framed data over TDM channels. At step 56 the gateway 10 determines whether an acknowledgment was sent by the destination device over a corresponding TDM bearer channel, the acknowledgment indicating that the destination device is also VoIP-capable and capable of supporting the common coding scheme. Similar to the embedded watermark, the acknowledgment may be in the form of a packet sequence in the returning PCM stream.

If an acknowledgment was detected at step 56, then at step 64 the gateway 10 enters a native packet mode by encoding its data using the common coding scheme. The encoded data is inserted into the TDM channel as a packet frame sequence, with known preamble and end-of-frame delineators, making it possible for both endpoints to identify start-of-frame and end-of-frame boundaries. Such delineators would be bit sequences of sufficient length to avoid false positives, and would not otherwise be allowed within the "bearer" data contained within an encoded data stream by an IP endpoint participating in such a session as determined by the negotiation of the common coding scheme. In addition, the encoding may take advantage of the fact that octet synchronization between the endpoints is maintained by the TDM PSTN by allowing frame delineation to start at octet boundaries, thereby reducing computational effort and time required to detect said delineators, and further reducing the likelihood of false positives.

As a simple example, if the two communication devices recognize that they can exchange compressed voice streams at a nominal data rate of 32 kb/s, then the encoded data is included in frames which add some overhead, but maintain a data rate of less than 64 kb/s. The frames are sent out in succession over the PCM channel, with preamble and end-of-frame sequences. Since the frames will not fill the entire channel capacity, idle characters are sent to fill in any remaining data capacity within the 64 kb/s PCM channel.

When the gateway 10 receives data from the other communication device over the TDM channel, the gateway 10 decodes it using the common coding scheme.

The data encoded at step 64 and inserted into the TDM channel need not be limited to voice data, but can also include images or other generic data such as "chat" text.

If the gateway 10 does not receive an acknowledgment to the embedded watermark at step 56, such as would be the case if the voice trunk connecting the gateways was not a transparent end-to-end TDM channel, or if the called device was a traditional telephone 20, an IP-enabled communication device in which the invention is not implemented, or an IP-enabled communication device which does not support the common coding scheme, then the gateway 10 converts its voice data to 64 kb/s PCM using conventional means at step 68 and inserts the PCM data into the TDM channel.

Figure 3:
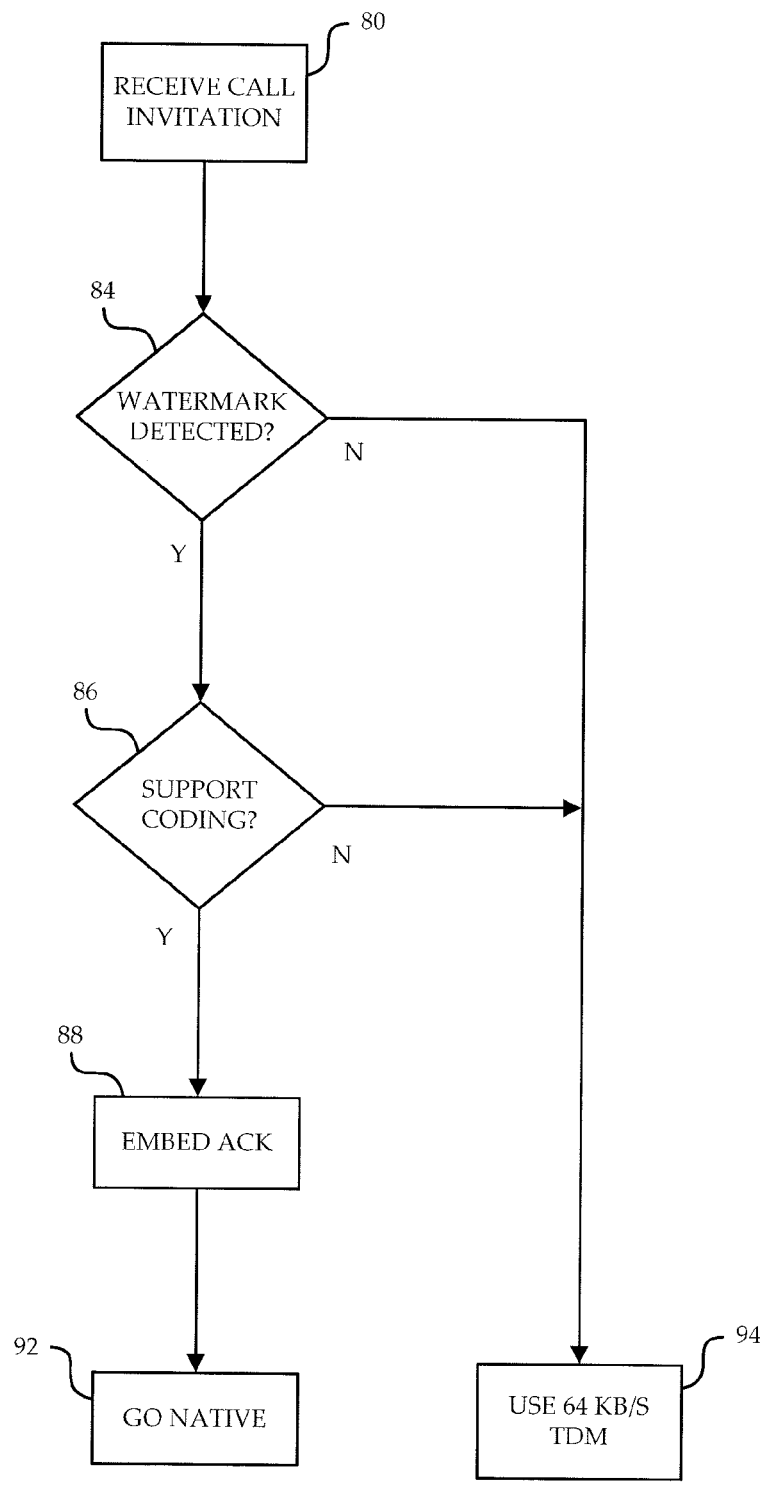
FIG. 3 is a flowchart of a method by which a gateway of FIG. 1 processes a call request according to one embodiment of the invention.

Referring to FIG. 3, a method by which the gateway 10 of FIG. 1 processes a call request according to one embodiment of the invention is shown. At step 80 the gateway 10 receives an invitation to a call through the conventional PSTN call setup mechanisms and protocols. With the voice bearer channel establish, the gateway 10 determines at step 84 whether the PCM stream contains a watermark indicating that the calling device is VoIP-capable and identifying a common coding scheme, such a watermark (if present) having been embedded in the PCM stream by the calling VoIP-capable communication device as described above with reference to step 52 of FIG. 2. If the gateway 10 detects such a watermark, the gateway 10 determines at step 86 if it can support the common coding scheme identified by the watermark. If the gateway 10 can support the common coding scheme, then the gateway 10 embeds an acknowledgment in its PCM stream to the calling device at step 88. The acknowledgment may be embedded in the PCM stream using the same techniques as used to embed the watermark in the PCM stream from the calling device, as described above with reference to step 52 of FIG. 2, but may of course be shorter or simpler.

If the two gateways recognize that each is capable of using the common coding scheme, then the gateway 10 enters a native packet mode at step 92 by encoding its data using the common coding scheme. The coded data is inserted into the TDM channel without conversion to 64 kb/s PCM, thereby avoiding lossy conversion of the end-to-end packet voice stream along with attendant increased latency, as described above with reference to step 64 of FIG. 2. When the gateway 10 receives data from the other communication device over the TDM channel, the gateway 10 decodes it using the common coding scheme.

If no watermark is detected at step 84, such as would be the case if the bearer channel was not a transparent TDM path or if the calling device was a traditional phone or an IP-enabled communication device in which the invention is not implemented, or the gateway 10 cannot support the common coding scheme, then at step 94 the gateway 10 encodes and decodes data using standard 64 kb/s PCM conversion.

Should the system encounter an intermediate switching system that is not sufficiently transparent (i.e. very lossy or analog, or if the call becomes part of a multi-party voice bridge), a graceful fall back to the standard VoIP to PCM conversion will take place. This would be determined in mid-call if frame synchronization loss was detected by the gateways, which are responsible for inserting, stripping, and identifying frame preamble and end sequences. Minor impairments to the TDM channel, which may be caused by noise or Robbed Bit Signaling, may be overcome by adding sufficient redundancy to the watermark and frame delineation capture algorithms.

The methods of the invention are preferably implemented as Digital Signal Processor firmware in the gateway. The invention may alternatively be implemented as a fixed function hardware processor or as software loaded onto a computer processor or other device within the gateway. The methods could also be implemented as a combination of software and hardware. If in the form of software, the logical instructions of the methods may be stored on a computer-readable storage medium in a form executable by a computer processor.

The invention has been described as the calling device's gateway identifying a proposed common coding scheme within the watermark at step 52, and the called device's gateway simply considering whether it can support the proposed common coding scheme. This assumes that the calling device's gateway can only support one type of coding scheme. Alternatively, the calling device's gateway may support more than one type of coding scheme. In such as embodiment, if the two gateways are VoIP-capable they may negotiate a common coding scheme. The negotiation may occur in any of a number of ways. As one example, the watermark embedded by the calling device's gateway identifies a first coding scheme supported by the calling device's gateway. If no acknowledgment is detected within a set time limit, or if an acknowledgment is received that indicated that the called device support VoIP but not the first coding scheme, then the calling device's gateway embeds a second watermark which identifies a second coding scheme supported by the calling device's gateway. This continues until either an acknowledgment is received indicating that the called device's gateway supports the coding scheme associated with a watermark, or the calling device's gateway has proposed all coding schemes that it supports. As another example, if the called device's gateway does not support the coding scheme initially proposed by the calling device's gateway, then the acknowledgment sent by the called device's gateway identifies a different coding scheme proposed by the called device's gateway. The two gateways continue proposing coding schemes to each other until a common coding scheme is agreed upon, or until a watermark or an acknowledgment is received that indicates that the gateway has no more supported coding schemes to propose, leaving the call to be established through conversion to PCM voice at each gateway.

The invention has been described as the watermarking and acknowledgment taking place during setup of the call. Alternatively, all calls could begin with 64 kb/s PCM conversion, and watermarks and acknowledgments being embedded in the TDM channels in parallel with the PCM call. Should the two gateways determine that each is capable of supporting VoIP during the call, the gateways can switch to encoding and decoding the communication using the common coding scheme. This embodiment provides the advantage that the calling device's gateway need not delay the start of the call for a preset time while it waits for an acknowledgment from the called device's gateway. Rather, the call begins with 64 kb/s PCM conversion, the calling device's gateway embeds a watermark indicating that it is capable of VoIP, and then continues with 64 kb/s PCM conversion until it receives an acknowledgment, if one arrives. In the embodiment in which the gateways negotiate a common coding scheme, the 64 kb/s PCM conversion can continue while the gateway devices agree on a common coding scheme.

The invention has been described as being carried out by a gateway separate from the communication device. Alternatively, the capability to embed watermarks and code data to either 64 kb/s PCM or to a common coding scheme may be implemented within the communication device itself, if it has direct access to the PSTN TDM channel. In this sense, the gateways discussed heretofore may be considered more broadly as IP-capable endpoints connected to the PSTN via a digital PCM communication link, which may include the VoIP-capable communication devices.

The embodiments presented are exemplary only and persons skilled in the art would appreciate that variations to the embodiments described above may be made without departing from the spirit of the invention.

I claim:

1. A method by which a first communication device, which is Voice over IP (VoIP)-capable, communicates with a second communication device over TDM channels of the PSTN, comprising:

informing the second communication device that the first communication device is VoIP-capable by embedding a watermark in communications transmitted over the PSTN;

determining whether the second communication device is VoIP-capable by searching for an acknowledgment embedded in communications received over the PSTN;

if it is determined that the second communication device is VoIP-capable, sending call session packet data to the second communication device as IP framed data over a TDM channel of the PSTN.

2. The method of claim 1 wherein the call session packet data is voice data.

3. The method of claim 1 wherein the call session packet data comprises image and/or text data.

4. The method of claim 1 wherein the first communication device sends call session packet data as IP framed data after encoding the call session packet data using a common coding scheme also used by the second communication device.

5. The method of claim 4 wherein the common coding scheme encodes wideband voice calls with native end-quality exceeding 64 kb/s PCM.

6. The method of claim 4 further comprising the first communication device and the second communication device negotiating the common coding scheme.

7. The method of claim 1 wherein sending data as IP framed data comprises:
generating encoded data by encoding the call session packet data to be transmitted using a common coding scheme used by both communication devices;
generating packet frames from the encoded data and inserting a preamble delineator and an end-of-frame delineator at the start and end, respectively, of each frame; and
inserting the packet frame-sequences into a 64 kb/s PCM channel.

8. The method of claim 7 further comprising:
if the generated packet frames contain data at less than 64 kb/s, inserting sufficient idle characters into the 64 kb/s PCM channel to fill the 64 kb/s PCM channel.

9. The method of claim 1 wherein the first communication device and the second communication device are in different operator domains.

10. The method of claim 1 wherein the first communication device is an IP-enabled telephone.

11. The method of claim 1 wherein the first communication device is a gateway that provides an IP-enabled telephone with access to the PSTN.

12. The method of claim 1 wherein the first communication device is an IP-enabled cellular phone.

13. The method of claim 1 wherein the first communication device is a gateway within a Mobile Switching Center that provides an IP-enabled cellular phone with access to the PSTN.

14. The method of claim 1 wherein the first communication device is a gateway within a Hybrid POTS/IP PBX.

15. A first communication device, which is Voice over IP (VoIP)-capable, comprising:
means for establishing a 64 kb/s TDM bearer channel with a second communication device over the PSTN;
means for embedding a watermark within the TDM bearer channel, the watermark indicating that the first communication device is VoIP-capable;
means for detecting an acknowledgment within the TDM bearer channel received from the second communication device, the acknowledgment indicating that the second communication device is VoIP-capable; and
means for sending call session packet data to the second communication device as IP framed data over the TDM bearer channel in the event that the acknowledgment is detected.

16. The first communication device of claim 15 wherein the call session packet data includes voice data.

17. The first communication device of claim 15 wherein the call session packet data includes image and/or text data.

18. The first communication device of claim 15 wherein the means for sending call session packet data to the second communication device comprise:
means for generating encoded data by encoding the call session packet data using a common coding scheme used by both communication devices;
means for generating packet frames from the encoded data and inserting a preamble delineator and an end-of-frame delineator at the start and end, respectively, of each frame; and
means for inserting the packet frame-sequences into the 64 kb/s TDM channel.

19. The first communication device of claim 18 wherein the means for sending call session packet data further comprise:
means for inserting sufficient idle characters into the 64 kb/s TDM channel to fill the 64 kb/s TDM channel, in the event that the generated packet frames contain data at less than 64 kb/s.

* * * * *